United States Patent [19]

Lenzer

[11] 4,259,830
[45] Apr. 7, 1981

[54] GEARING ARRANGEMENT FOR AN AGRICULTURAL ATTACHMENT

[75] Inventor: Xaver Lenzer, Sandberg, Fed. Rep. of Germany

[73] Assignee: Karl Mengele & Söhne, Gunzburg, Fed. Rep. of Germany

[21] Appl. No.: 929,978

[22] Filed: Aug. 1, 1978

[30] Foreign Application Priority Data

Aug. 6, 1977 [DE] Fed. Rep. of Germany ....... 2735598

[51] Int. Cl.³ .......................... A01D 69/00; F16H 3/34
[52] U.S. Cl. ....................................... 56/10.8; 74/354
[58] Field of Search ................... 56/10.8, 11.4; 74/352, 74/353, 354

[56] References Cited

U.S. PATENT DOCUMENTS

| 975,748 | 11/1910 | Carroll | 74/354 X |
| 3,938,437 | 2/1976 | Punater | 74/354 X |
| 3,945,175 | 3/1976 | Barkstrom et al. | 56/10.8 |

FOREIGN PATENT DOCUMENTS 582094  8/1933  Fed. Rep. of Germany ............ 74/354

Primary Examiner—Robert Mackey
Attorney, Agent, or Firm—Toren, McGeady and Stanger

[57] ABSTRACT

In an agricultural attachment, a gearing arrangement is provided to connect a driven gear in the attachment to a power take-off connection on a tractor. The gearing arrangment includes drive gears spaced laterally apart, each of a different size, and each mounted on a different shaft. The drive gear shafts are disposed in spaced parallel relation to the shaft on which the driven gear is positioned. The drive gears are mounted in a casing formed by two half shells and can be swung through an arc about the axis of the shaft of the driven gear for affording an optimum connection to the power take-off connection of the tractor.

5 Claims, 2 Drawing Figures

GEARING ARRANGEMENT FOR AN AGRICULTURAL ATTACHMENT

SUMMARY OF THE INVENTION

The present invention is directed to a gearing arrangement for an agricultural attachment, such as for a forage harvester, operating at various speeds and connectible to the power take-off connection of a tractor.

In most agricultural attachments or machines which are pulled or pushed by a tractor or are attached to a tractor, the power transmission is supplied to it through a power take-off shaft on the tractor. At the present time, the power take-off from a tractor is graduated to two speeds, that is, 540 and 1,000 rpm.

As a rule, the speed of a tractor drive is adjusted to the various tasks it is to perform in the field or for transmitting power by a gear arrangement to agricultural attachments or machines connected to the tractor. The gear arrangements along with the gearing of the auxiliary drive of the tractor both share in the task of any further reduction or increase in the motor speed as required.

There is a known gear arrangement where the two speeds of the power take-off or auxiliary drive connection of the tractor can be further reduced by means of a larger driven gear associated with a drive gear. However, such gear arrangements within agricultural attachments or machines do not allow a multiple reduction. On the contrary, for each attachment or for each different use to which the attachment is placed there must be a different gear arrangement or an elaborate gear shift system must be used.

In the use of agricultural attachments for comminuting different harvested agricultural materials, different speed ranges must be used. Forage harvesters having various feed conveyors are an example of such agricultural attachments. In the comminuting operation, grass is chopped up in a low speed range while corn is chopped up in a high speed range.

Accordingly, the primary object of the present invention is to provide a gearing arrangement for an agricultural attachment or machine, particularly for a forage harvester, in which it is possible to select various speeds for comminuting different kinds of harvested agricultural material in an inexpensive and simple manner.

In accordance with the present invention, a gearing arrangement is mounted within the housing of an agricultural attachment and has at least two drive gears of different size mounted on axes parallel to the axis of a driven gear which drives the working part of the attachment. The gearing arrangement is mounted in the housing so that it can be swung along an arc centered on the axis of the driven gear. The hubs or shafts of the drive gears are arranged to be connected to the power take-off connection of a tractor. The attachment housing has a number of brackets so that the gearing arrangement can be fixed in a selected position.

The position of the drive connection between the tractor and the agricultural attachment can be selected in a simple manner so that there is no undue bending of the interconnected shafts. Further, the gearing arrangement includes a pair of half sheels which enclose the two drive gears in a tightly fitting casing so that the drive gears along with their shafts or hubs can be swung in an arc about the axis of the driven gear and can be secured in a desired position.

By virtue of the short dimension of the gearing arrangement of the present invention in its axial direction, the agricultural attachments or machines using the arrangement can be constructed with a shorter structural length. As a result, the combined tractor-agricultural attachment has improved maneuverability.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
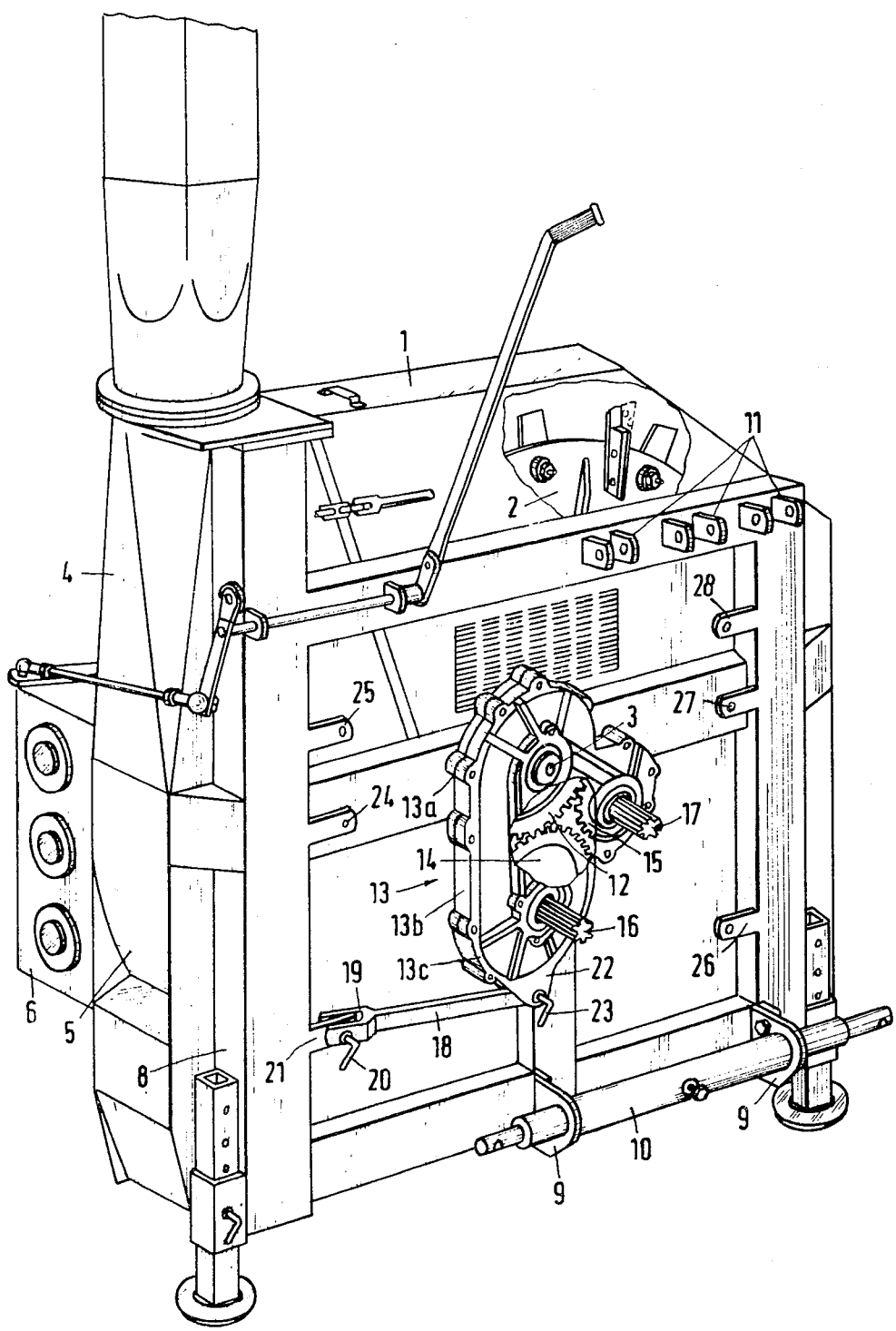
FIG. 1 is a perspective view, partly broken away of a flywheel cutter or chopper for comminuting agricultural materials.
Figure 2:
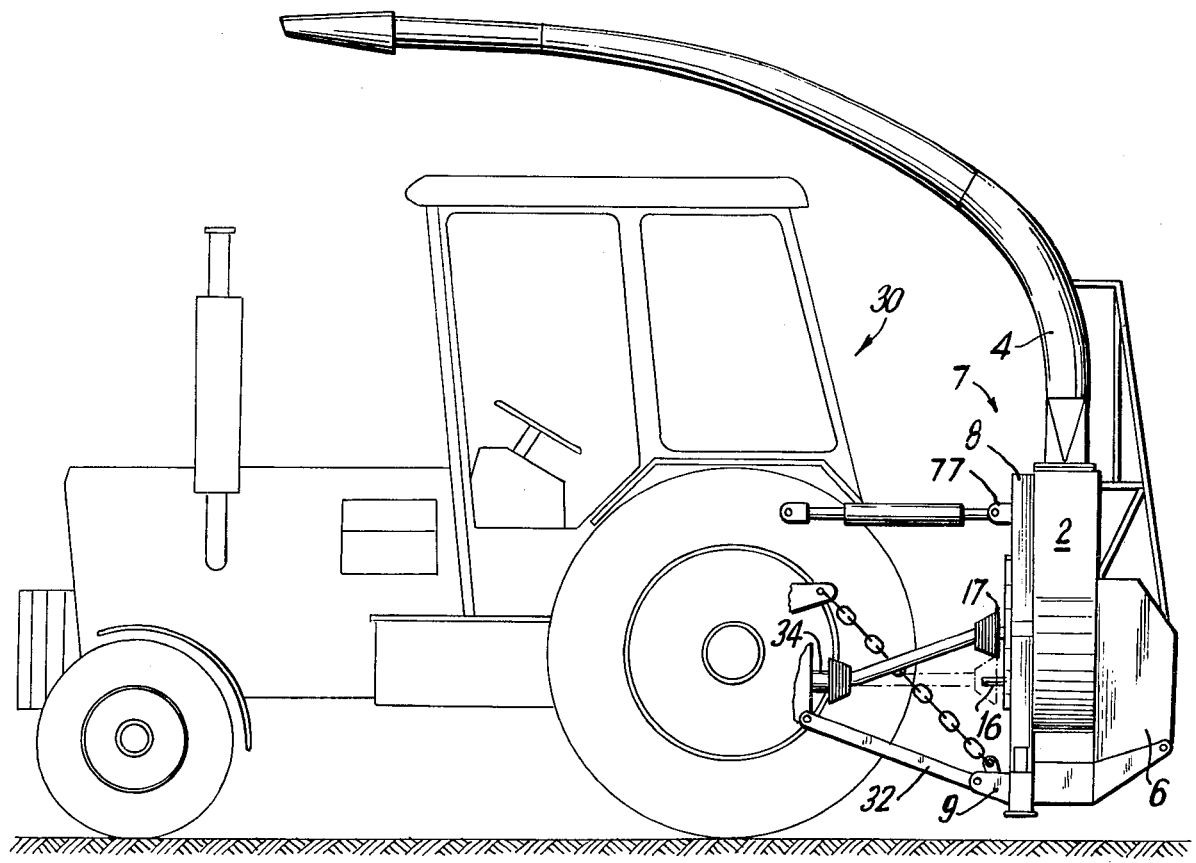
FIG. 2 is a schematic side view of a tractor showing the connector of the flywheel cutter or chopper in FIG. 1 to the tractor.

In FIG. 1, the flywheel cutter includes a housing 1 enclosing a knife disk 2 rotatably mounted on a gear shaft, not shown, which is coupled to a driven shaft 3. A material discharge 4 is shown on the left hand side of the housing in the drawing, connected to a cylindrical support wall 5. Agricultural material is supplied to the flywheel cutter through the intake 6. Housing 1 includes a supporting frame 8 on which a pair of spaced lugs 9 are provided. A supporting member 10 extends between the lugs 9 and is arranged for connection to the lower guide member, of a tractor 30. In other words, the side of the housing containing the lugs 9 and the support member 10 faces toward the tractor. Spaced upwardly from the lugs 9 are a number of laterally spaced lugs 11 for connection to the upper guide member, of the tractor. By connecting the flywheel cutter to the tractor it can be carried along with its center of gravity close to the tractor. The agricultural material pick-up device for the flywheel cutter is not shown. The lower guide members 32 of the tractor 30 connected to the supporting member 10 lower the cutter into the operating position or raise it into the transport position.

In accordance with the present invention, a gear arrangement 13 includes a driven gear 12 secured to the shaft 3 which is coupled to the shaft, not shown, of the knife disk 2. The gear arrangement 13 is driven by either one of two drive gears 14, 15, each of a different size with the gear used being selected in accordance with the speed required. Shafts or hubs, 16, 17 on which the drive gears 14, 15 are secured, respectively, are selectively connectible to a power take-off 34 of the tractor 30.

Gear arrangement 13 includes a casing enclosing the drive gears 14, 15 and the casing consists of a pair of half shells 13b, 13c each located on an opposite side of the gears and secured together in a tight fit along the junction 13a. The half shells 13b, 13c can be bolted together or secured in some other manner.

As can be seen in the drawing, the shafts or hubs 16, 17 which are connected to the power take-off 34 of the tractor 30, extend outwardly from the casing about the drive gears. The casing along with the shafts 16, 17 are supported so that the unit can be swung in an arc centered on the axis of the shaft 3 into the position most favorable for connecting one of the shafts, 16, 17 to the power take-off 34 on the tractor so that the connection will have a minimum bending angle.

A connecting arm 18 serves to lock the casing of the gear arrangement 13 in a desired position. At one end, the connecting arm has a fork 19.

In the position shown in FIG. 1, the fork 19 at one end of the arm 18 is connected by a pin 20 to a bracket 21 extending outwardly from the supporting frame 8. The other end of the connecting arm is secured by a pin 23 to a fork-shaped attachment 22 provided by the half shells 13b, 13c forming the casing of the gear arrangement 13. Further, additional brackets 24, 25, 26, 27, 28 are spaced along both sides of the supporting frame 8 affording a multiple number of positions for connecting the shaft 16 or 17 to the power take-off 34 on the tractor 30. The casing including the gears 14, 15 is swung through an arc about the axis of the shaft 3 until the desired position of the shaft 16 or 17 is located relative to the power take-off connection on the tractor and then the connecting arm 18 is secured to one of the brackets 21, 24–28, to retain the gearing arrangement in the desired position.

If the brackets 24 and 27 have the appropriate adjusted length, instead of using the connecting arm 18, the attachment 22 can be secured directly to these two brackets.

While specific embodiments of the invention have been shown and described in detail to illustrate the application of the inventive principles, it will be understood that the invention may be embodied otherwise without departing from such principles.

I claim:

1. An agricultural attachment for a tractor for performing work on an agricultural material connectible to a power take-off connection on a tractor so that the tractor can pull and power the agricultural attachment, comprising a housing, a rotatable working means positioned in said housing for performing work on the agricultural material, a first shaft located within said housing for transmitting driving force to said working means, said first shaft extending outwardly from said housing, a first gear mounted on said first shaft outwardly from said housing, wherein the improvement comprises gearing means connectible to the tractor power take-off connection for transmitting driving power at different selected speeds to said first gear, said gearing means comprising a second shaft and a third shaft disposed in laterally spaced parallel relation to one another and to said first shaft and located outwardly from said housing, a second drive gear secured on said second shaft for selectively driving said first gear, a third drive gear of a significantly different size from said second drive gear mounted on said third shaft for selectively driving said first gear, means mounted on said housing for supporting said second and third shafts and said second and third gears mounted thereon and for displacing said second and third shafts through an arc centered about the axis of said first gear for selectively engaging one of said second and third shafts with the tractor power take-off connection so that the connection has a minimum bending angle, and means for securing said supporting means on said housing in a plurality of selected positions on the arc about the axis of said first gear within said housing, said housing including a surface facing toward said first gear, said surface having a pair of sides each located on an opposite side from and spaced outwardly from said first gear, said securing means comprises a plurality of brackets located in spaced relation along each of said sides with each of said brackets affording a different selected position for said supporting means.

2. An agricultural attachment, as set forth in claim 1, wherein said means for supporting said second and third shafts comprises a pair of half shells extending transversely of the axial direction of said first shaft and means for securing said half shells tightly together, each said half shell enclosing an opposite side of said second and third drive gears and combining to form a casing enclosing said second and third drive gears.

3. An agricultural attachment, as set forth in claim 2, wherein said half shells have an attachment section, and means for connecting said attachment section to a selected one of said brackets.

4. An agricultural attachment, as set forth in claim 3, wherein said connecting means comprises a pin for connecting said attachment section to one of said brackets.

5. An agricultural attachment, as set forth in claim 3, wherein said connecting means comprises a connecting arm having a first end and a second end with said first end connected to said attachment section and said second end connected to a selected one of said brackets.

* * * * *